US012741773B2

(12) United States Patent
Hung

(10) Patent No.: US 12,741,773 B2
(45) Date of Patent: Sep. 22, 2026

(54) DEHUMIDIFICATION DEVICE OF PACKAGE THERMAL-SHRINKING OVEN

(71) Applicant: Tzu-Chin Hung, Taipei City (TW)

(72) Inventor: Tzu-Chin Hung, Taipei City (TW)

( * ) Notice: Subject to any disclaimer, the term of this patent is extended or adjusted under 35 U.S.C. 154(b) by 588 days.

(21) Appl. No.: 18/456,009

(22) Filed: Aug. 25, 2023

(65) Prior Publication Data

US 2024/0076084 A1 Mar. 7, 2024

(30) Foreign Application Priority Data

Sep. 5, 2022 (TW) ................................ 111209658

(51) Int. Cl.
*B65B 53/06* (2006.01)
*F26B 21/45* (2026.01)
(Continued)

(52) U.S. Cl.
CPC ............ *B65B 53/063* (2013.01); *F26B 21/45* (2026.01); *F26B 21/50* (2026.01); *F26B 23/04* (2013.01)

(58) Field of Classification Search
CPC .......... F26B 21/50; F26B 21/33; F26B 25/00; F26B 25/003; F26B 23/04; F26B 15/18;
(Continued)

(56) References Cited

U.S. PATENT DOCUMENTS 3,678,244 A * 7/1972 Worline ................ B65B 53/063
432/198
2023/0234739 A1 * 7/2023 Pinyayev .............. B65B 53/063

FOREIGN PATENT DOCUMENTS

CN 103776816 A * 5/2014
CN 109429488 A * 3/2019 ......... B01D 53/0415
(Continued)

OTHER PUBLICATIONS

Translation, JP-S5818571-Y2 (Year: 1983).*
Translation, CN-109429488-A (Year: 2019).*
Translation, CN-103776816-A (Year: 2014).*

*Primary Examiner* — Jessica Yuen
(74) *Attorney, Agent, or Firm* — Rosenberg, Klein & Lee

(57) ABSTRACT

A dehumidification device of a package thermal-shrinking oven includes at least one thermal-shrinking oven body for being combined with a packaging and conveying strip for conveying an object-to-be-packaged and having a lower portion that is provided with at least one pair of connecting portions, at least one steam conduit having a lower end connected with at least one steam device, at least one thermal isolation board mounted to an upper portion of interior of the steam conduit and enclosing two sides of the packaging and conveying strip, at least one pair of first heaters respectively mounted to two sides of exterior of the steam conduit, at least one second heater mounted to a bottom of interior of the steam conduit, and at least one pair of third heaters respectively mounted to two sides of exterior of the thermal-shrinking oven body. The connecting portions of the thermal-shrinking oven body respectively receive two sides of an upper portion of the steam conduit to connect thereto, so that hot steam generated by a steam device is introduced into the steam conduit and the first and second heaters first heat up the hot steam to become moisture-removed hot gas to be guided by the two sides of the upper portion of the steam conduit through the connecting portions into the interior of the thermal-shrinking oven body to implement a heat-shrinking packaging operation on the object-to-be-packaged located on the packaging and conveying strip, and the third heaters are operable for synchronously implementing dry and hot air heat-shrinking pack-
(Continued)

aging operation in the interior of the thermal-shrinking oven body for an enhanced moisture removing effect.

11 Claims, 6 Drawing Sheets

(51) Int. Cl.
*F26B 21/50* (2026.01)
*F26B 23/04* (2006.01)

(58) Field of Classification Search
CPC ...... F26B 21/45; F26B 21/452; B65B 53/063; B65B 53/26; B65B 53/005; B65B 2257/80
See application file for complete search history.

(56) References Cited

FOREIGN PATENT DOCUMENTS

| | | | | | |
|---|---|---|---|---|---|
| EP | 3831730 | A1 * | 6/2021 | ............. | B65B 63/08 |
| JP | S5818571 | Y2 * | 4/1983 | | |
| JP | 6412937 | B | 10/2018 | | |
| TW | M335484 | U | 7/2008 | | |
| TW | M444345 | U | 1/2013 | | |

* cited by examiner

DEHUMIDIFICATION DEVICE OF PACKAGE THERMAL-SHRINKING OVEN

BACKGROUND OF THE INVENTION

1. Field of the Invention

The present invention relates to a dehumidification device of a package thermal-shrinking oven, and in particular to a dehumidification device that is used in heat-shrinking packaging of a heat-shrinking packaged object and includes heaters provided on a steam conduit that supplies a heat source to a thermal-shrinking oven and outside of the thermal-shrinking oven to assist heating for forming a dry hot gas flow.

2. The Related Arts

Package films have been widely used in packaging applications for various packaged objects, particularly for sealing of the packaged objects that may have different outside contours and shapes, such as meal boxes, noodles, medicinal cuisines, salads, compact disc (CD) boxes, gifts, and so on. Due to the shapes and sizes of the meal boxes that contain therein foodstuffs, or CD boxes, or gift packs being generally different from each other, in the packaging industry, to implement an operation of sleeving a packaged object with a plastic film and depositing into a sealing and packaging apparatus for heat-shrinking to seal and package connection between a box and a cover of the packaged object, it is common practice to first place the heat-shrinkable film over the entirety or a major portion of the packaged object, and then a thermal-shrinking oven or a baking oven is used to thermally shrink the film, such that the heat-shrinkable film can cover the entirety or a major portion of the packaged object for packaging and sealing.

To provide a homogeneous heat source for heat shrinking conducted in a thermal-shrinking oven, high-temperature steam is commonly used as a heat source of the thermal-shrinking oven, in order to develop homogenous heat shrinkage during heat shrinking of the heat-shrinkable film sleeved on the packaged object for ensuring the quality of heat shrinking for the thermal-shrinking packaged object. Since the heat source of the thermal-shrinking oven is high-temperature steam, after the operation of thermal shrinking for the packaged object, liquid water or water droplets will present on the surface of the heat-shrinkable film and the surface of the thermal-shrinking packaged object. This often causes concerns of product hygiene or food safety issues for being potentially affected by mold and mildew due to moisture present on the thermal-shrinking packaged object, and thus, it is often necessary to manually wipe off the liquid droplets, or secondary processing is required by using high-temperature dehumidification apparatus or work station in order to remove the potential issue of liquid water or water droplets existing on the surface of the heat-shrinkable film. Correspondingly, labor or installation must be increased to thereby increase the cost and time of processing. Further, in case that high-temperature secondary processing equipment is applied to remove the water liquid or water droplets existing on the surface of the surfaces of the thermal-shrinking packaged object and the heat-shrinkable film, the high temperature of the secondary processing may cause inhomogeneous heating on the heat-shrinkable film on the thermal-shrinking packaged object to eventually lead to cracking or wrinkling of the film. This severely affects the yield of the heat-shrinking packaging of the thermal-shrinking packaged object. This is a problem to be handled for the known heat-shrinking packaging applying heat-shrinkable films.

Prior art patent documents are known, such as Japanese Laid-Open Patent No. 6412937, which proposes a heat-shrinking device for shrinkable label, wherein a known structure of a thermal-shrinking oven including a typical steam based heat source is disclosed. The prior art Japanese Patent aims to eliminate dewing of steam on a heat-shrinking container (PC). In a heating treatment chamber (2), in addition to an existing heat shrinking zone (ZA) in which operation of heat shrinking is conducted with the steam based heat source on the container (PC), a drying zone (ZB) that has a sophisticated structure is arranged posterior to the heat shrinking zone (ZA) for removing moisture. The cost of the entire thermal-shrinking equipment is thus increased, and in addition, the container (PC), after being processed for heat shrinking in the heat shrinking zone (ZA), has to subject to secondary heating by dry and hot air in the drying zone (ZB). Specifically, the Japanese patent proposes a drying blower (26) used for such a purpose, and a tubular label (L) on the surface of the container (PC) may get cracking or wrinkling due to secondary high temperature heating or inhomogeneous heating by the dry and hot airflow of the drying blower (26), and this results in drawbacks in respect of heat-shrinking packaging quality on the surface of the container (PC) and the defect rate thereof. As such, same problems and drawbacks of cracking and wrinkling caused by secondary high-temperature processing or inhomogeneous heating on the heat-shrinkable film on the outside of the heat-shrinking packaged object resulting from the operation of removing moisture in the known thermal-shrinking oven are also present and would severely affects the yield of heat shrinking packaging for the heat-shrinking packaged object.

In addition, Taiwan Utility Model M335484, which provides a steam based shrinking oven, and Taiwan Utility Model M444345, which provides a steam-based heat-baking shrinking oven structure, propose steam-based thermal-shrinking oven structures having a single steam heat source, wherein an object-to-be-packaged, such as a jar (11) and a bottle (2) is subjected to an operation of heat shrinking by applying high temperature steam thereto. Similarly, there are problems of water liquid and water droplets existing on a surface of a thermally shrunk label (13) or a heat-shrinkable film, and the issue of removal of water liquid or water droplets on the surface of the label (13) or the heat-shrinkable film, or even water accumulation thereon, by means of manually wiping or other high-temperature dehumidification devices or work stations is present similar to those known steam based thermal-shrinking oven. And correspondingly, the processing cost and time are increased due to additional human labor or equipment being applied. Further, cracking and wrinkling caused by secondary high-temperature processing or inhomogeneous heating on the label (13) or the heat-shrinkable film on the outside of the heat-shrinking packaged object resulting from the operation of removing liquid water or water droplets on the surface of the heat-shrinking object of the jar (11) or bottle (2) by applying the secondary high temperature equipment would severely affects the yield of heat shrinking packaging for the heat-shrinking packaged object.

SUMMARY OF THE INVENTION

In the moisture removing measures adopted in the previously discussed known package thermal-shrinking oven or the above-mentioned patents, after the operation of packaging through heat shrinking, a large amount of liquid water or water droplets would be present on the surface of the heat-shrinkable film and the surface of the heat-shrinking packaged object, and this leads to concerns about product hygiene or food safety due to mold or mildew caused on the heat-shrinking packaged object by the moisture, and has to be processed through manual wiping or secondary processing by other high temperature dehumidification devices or work stations in order to remove the large amount of liquid water or water droplets from the surfaces of the heat-shrinking packaged object and the heat-shrinkable film. This results in increase of human labor and work hour and installation cost. The heat-shrinkable film on the outside of the heat-shrinking packaged object would get cracking or wrinkling due to the secondary high temperature processing or inhomogeneous heating and this severely affects the yield of heat shrinking packaging for the heat-shrinking packaged object.

Thus, the present invention provides a dehumidification device of a package thermal-shrinking oven, which comprises:

at least one thermal-shrinking oven body, which is combined with a packaging and conveying strip for conveying an object-to-be-packaged, two sides of a lower portion of the thermal-shrinking oven body being each provided with at least one connecting portion;

at least one steam conduit, which is connected, at a lower end thereof, with at least one steam device, so that hot steam generated by the steam device is conducted into the steam conduit, two sides of an upper portion of the steam conduit being respectively connected to the connecting portions on the two sides of the lower portion of the thermal-shrinking oven body;

at least one thermal isolation board, which is mounted to an upper portion of interior of the steam conduit and enclosing two sides of the packaging and conveying strip;

at least one pair of first heaters, which are respectively mounted to exterior of two sides of the steam conduit to provide a first heating operation on the hot steam at two sides of the steam conduit to form moisture-removing dry hot gas for being subsequently guided along the two sides of the upper portion of the steam conduit through the connecting portions of the thermal-shrinking oven body into an interior of the thermal-shrinking oven body to implement a heat-shrinking packaging operation on the object-to-be-packaged located on the packaging and conveying strip;

at least one second heater, which is mounted on a bottom of interior of the steam conduit to carry out the first heating operation, in synchronization with the first heaters on the hot steam at a bottom of interior of the steam conduit; and at least one pair of third heaters, which are respectively mounted to two sides of exterior of the thermal-shrinking oven body to carry out an enhanced moisture-removing effect in synchronization with the heat-shrinking packaging operation of the dry hot air in the interior of the thermal-shrinking oven body.

Further, in the above dehumidification device of the package thermal-shrinking oven according to the present invention, the thermal-shrinking oven body has a top that is formed with at least one ventilation orifice for discharging the hot gas that is applied to implement heat-shrinking packaging on the object-to-be-packaged inside the thermal-shrinking oven body.

In the above dehumidification device of the package thermal-shrinking oven according to the present invention, the two sides of the lower portion of the thermal-shrinking oven body are each combined with at least one mounting frame for being combined with two sides of the packaging and conveying strip by means of the mounting frames.

In the above dehumidification device of the package thermal-shrinking oven according to the present invention, the two sides of the lower portion of the thermal-shrinking oven body are each provided with at least one pair of connecting lugs, the connecting lugs being each formed with at least one elongated hole; and the mounting frames each have a top surface that is formed with at least one pair of fastening apertures to respectively correspond to the elongated holes of the connecting lugs of the thermal-shrinking oven body to be fastened thereto and combined therewith by means of at least one pair of bolts.

In the above dehumidification device of the package thermal-shrinking oven according to the present invention, the mounting frames that are mounted to the lower portion of the thermal-shrinking oven body each have a lower end that is formed with a plurality of elongated connecting holes for each being fastened by at least one bolt to two sides of the packaging and conveying strip.

In the above dehumidification device of the package thermal-shrinking oven according to the present invention, the two sides of the lower portion of the thermal-shrinking oven body are each combined with at least one mounting frame, the mounting frames each having a lower-portion middle section that is provided with at least one pair of joining portions, the joining portions being each formed with at least one threaded hole; and at least one pair of protective covers are respectively arranged to enclose two sides of the steam conduit and outsides of the first heaters, and two sides of an upper portion of each of the protective covers are each provided with at least one elongated hole, the elongated holes respectively corresponding to the threaded holes of the joining portions of the mounting frames to each receive at least one bolt penetrating through and fastened to the corresponding threaded hole for fixing and combining.

In the above dehumidification device of the package thermal-shrinking oven according to the present invention, the steam conduit is provided, on a lower end thereof, with an ingress opening so as to connect by means of the ingress opening to the steam device to introduce the hot steam into the steam conduit.

In the above dehumidification device of the package thermal-shrinking oven according to the present invention, the steam conduit is provided, on an external part of an upper portion thereof, with at least one pair of lugs, the lugs being each formed with at least one threaded fastening hole, and the two sides of the upper portion of the thermal isolation board are each formed with at least one pair of through holes, the through holes corresponding to the threaded fastening holes of the lugs of the steam conduit to each receive at least one bolt to penetrate therethrough for fastening and connecting.

In the above dehumidification device of the package thermal-shrinking oven according to the present invention, the steam conduit has a cross-section having a Y-shape.

In the above dehumidification device of the package thermal-shrinking oven according to the present invention, the two sides of the upper portion of the thermal isolation board are each formed with at least one pair of fastening apertures to respectively fasten by means of at least one fastening bolt to two sides of the packaging and conveying strip with which the thermal-shrinking oven body is combined.

In the above dehumidification device of the package thermal-shrinking oven according to the present invention, the first heaters, the second heater, and the third heaters are formed of silicone rubber electrical heating plates.

In the above dehumidification device of the package thermal-shrinking oven according to the present invention, the second heater has a cross-section having a V-shape.

The efficacy of the dehumidification device of the package thermal-shrinking oven according to the present invention is that the first heaters, the second heater, and the third heaters are respectively mounted to the steam conduit and the exterior of the thermal-shrinking oven body to correspond to a path of hot steam conveyance and dry hot gas heat-shrinking packaging operation, in order to remove moisture from hot steam generated by the steam device to which the steam conduit is connected to form dry hot gas to implement a homogeneous and dry-hot-gas-based heat-shrinking packaging operation on the object-to-be-packaged located on the packaging and conveying strip and inside the thermal-shrinking oven body to have the heat-shrinkable film that is sleeved on the object-to-be-packaged thermally shrunk, for one time operation, on and package an outside surface of the object-to-be-packaged, and further, no liquid water and water droplets are accumulated on the surfaces of the heat-shrinkable film and the object-to-be-packaged to ensure clean and hygiene of the outside surfaces of the object-to-be-packaged and the heat-shrinkable film and food safety, and there is no need for manually wiping off or applying other high temperature equipment or workstations to carry out secondary processing, so as to greatly save human labor, working hours, and installation expenditure, and the quality and yield of heat-shrinking packaging of a heat-shrinkable film on an object-to-be-packaged can be enhanced to completely eliminate and overcome the problems and drawbacks of the prior art steam heat source based thermal-shrinking oven that a heat-shrinking packaged object and the heat-shrinkable film thereof have a large amount of liquid water and water droplets remaining on the surfaces thereof to result in increase of human labor working hours and installation expenditure, and that the heat-shrinkable film on the outside of the heat-shrinking packaged object may become cracking or wrinkling due to secondary high temperature processing or inhomogeneous heating to thereby severely affect the yield of heat-shrinking packaging of the heat-shrinking packaged object, and therefore, the industrial utilization and economic interest of the present invention can be further improved.

DETAILED DESCRIPTION OF THE PREFERRED EMBODIMENTS

Figure 1:
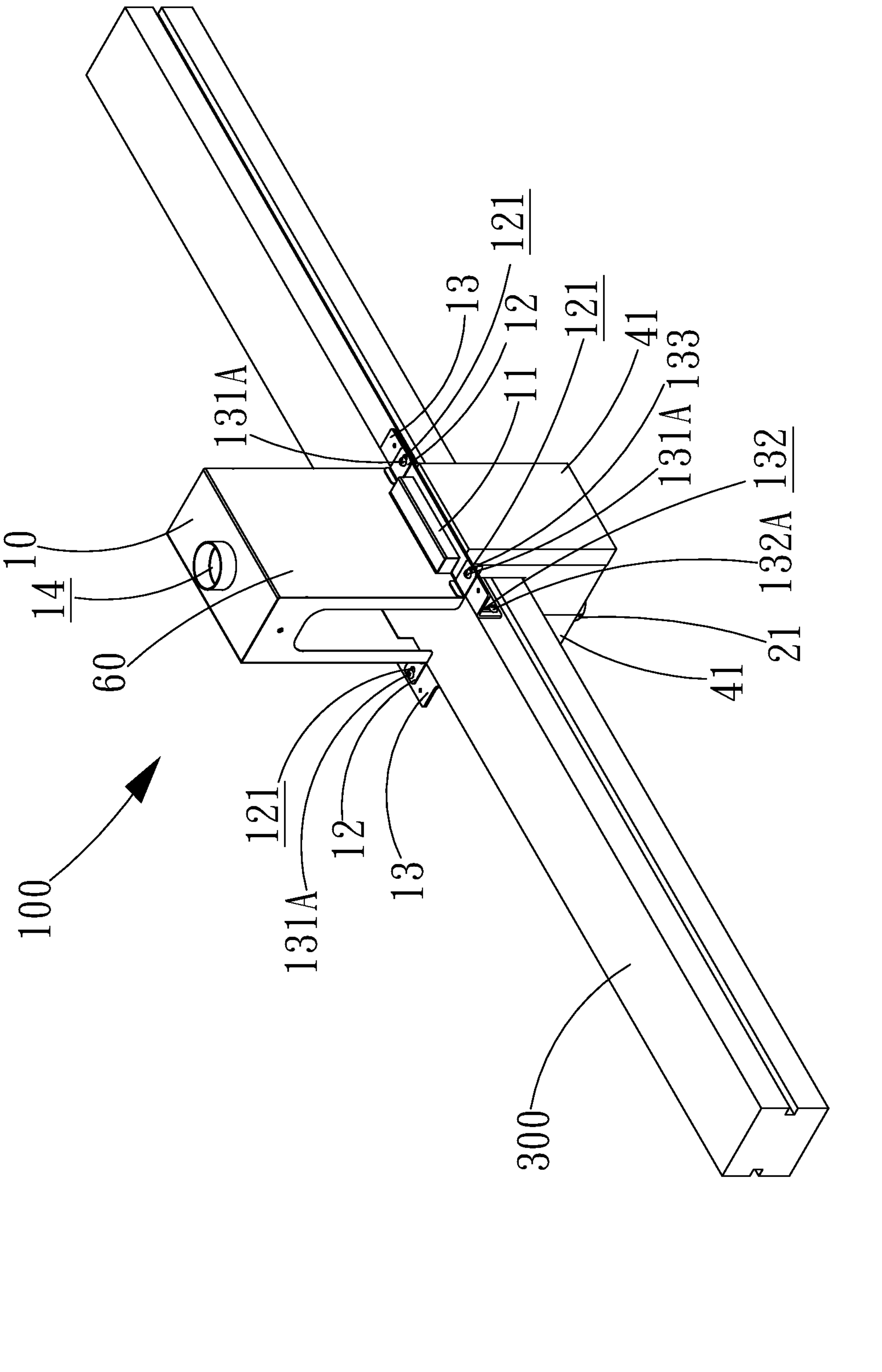
FIG. 1 is a perspective view showing a dehumidification device of a package thermal-shrinking oven according to the present invention.
Figure 2:
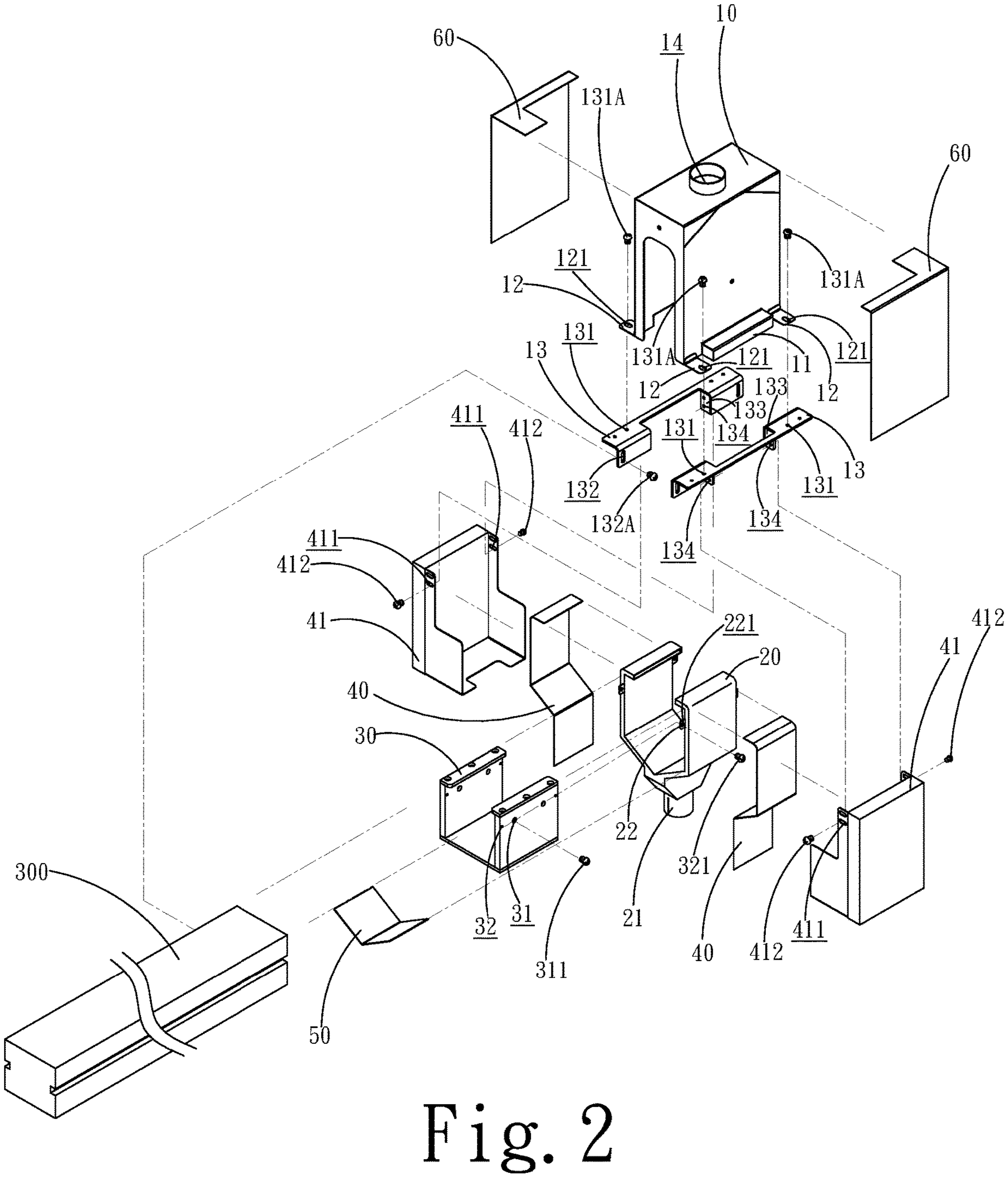
FIG. 2 is an exploded view showing the dehumidification device of the package thermal-shrinking oven according to the present invention.
Figure 3:
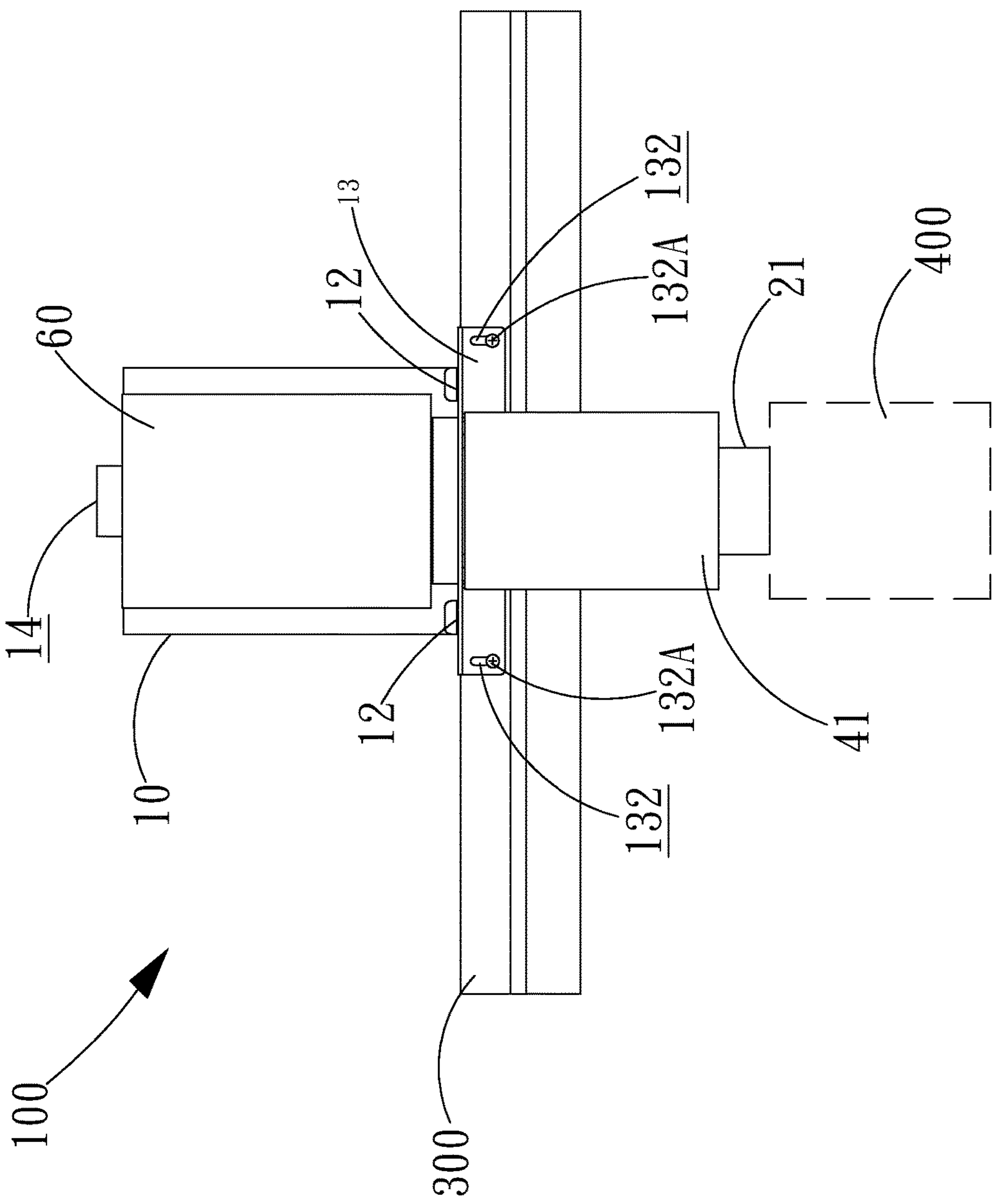
FIG. 3 is a front view showing the dehumidification device of the package thermal-shrinking oven according to the present invention.
Figure 4:
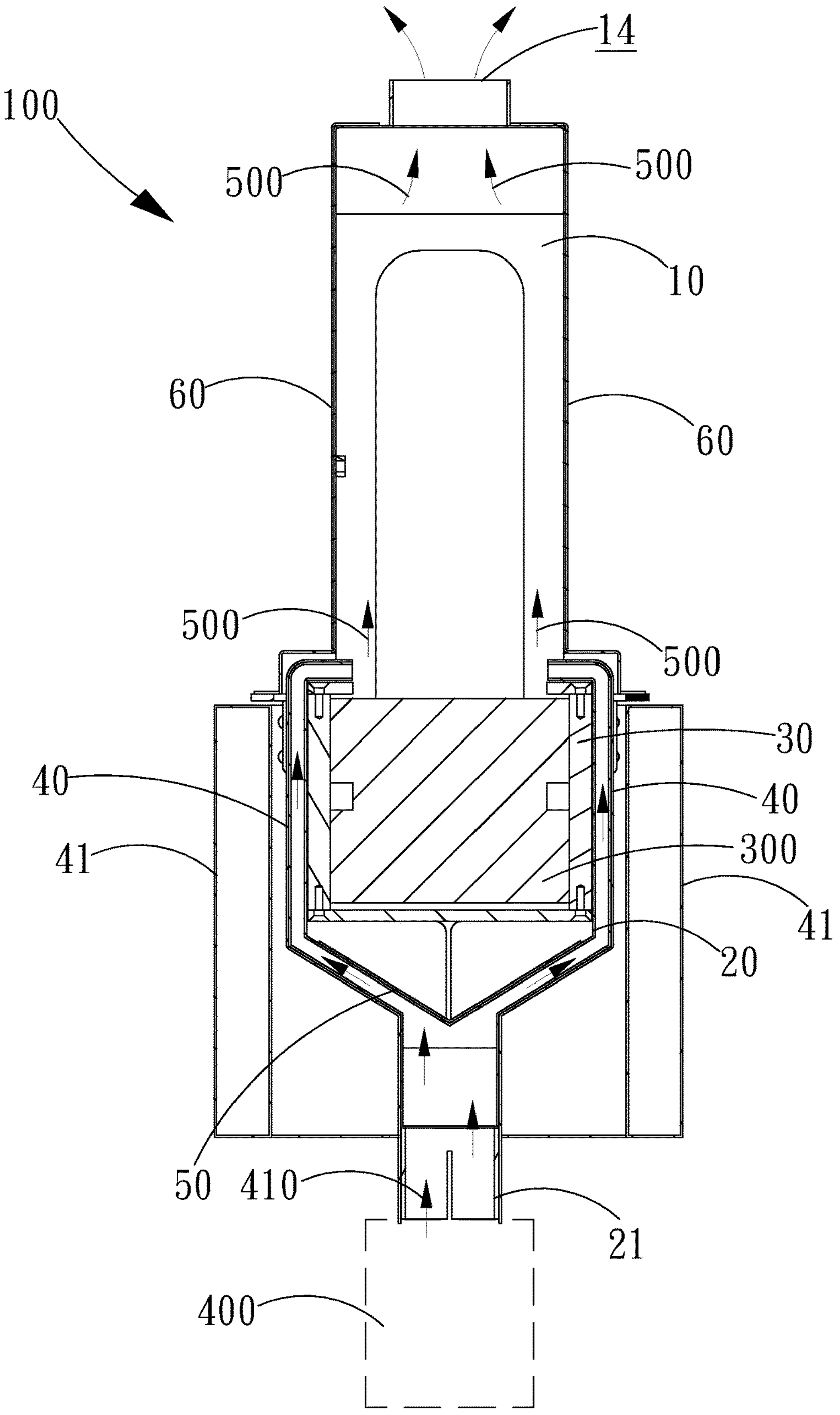
FIG. 4 is a side elevational view showing the dehumidification device of the package thermal-shrinking oven according to the present invention.
Figure 5:
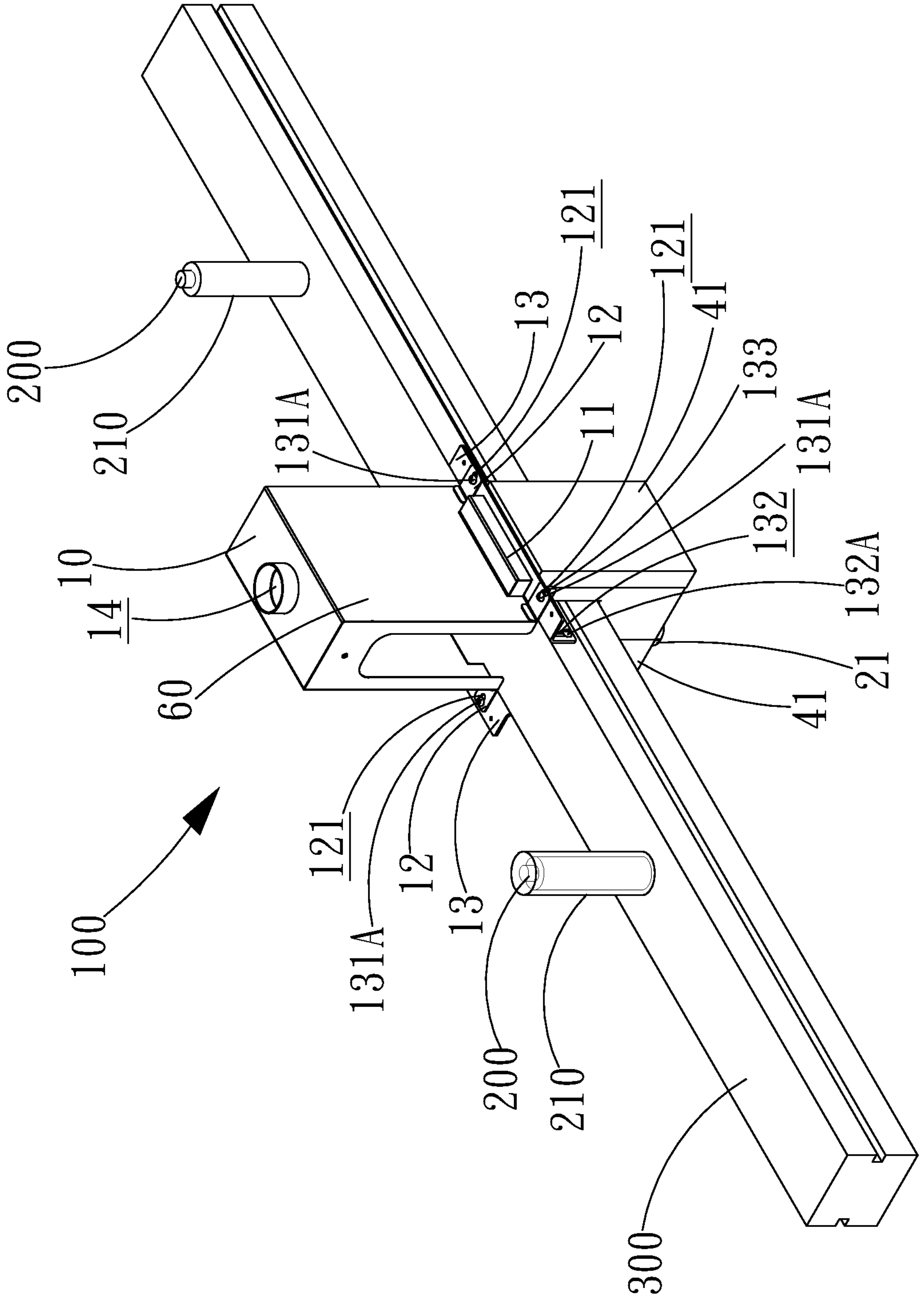
FIG. 5 is a schematic view illustrating a preferred application of the dehumidification device of the package thermal-shrinking oven according to the present invention.
Figure 6:
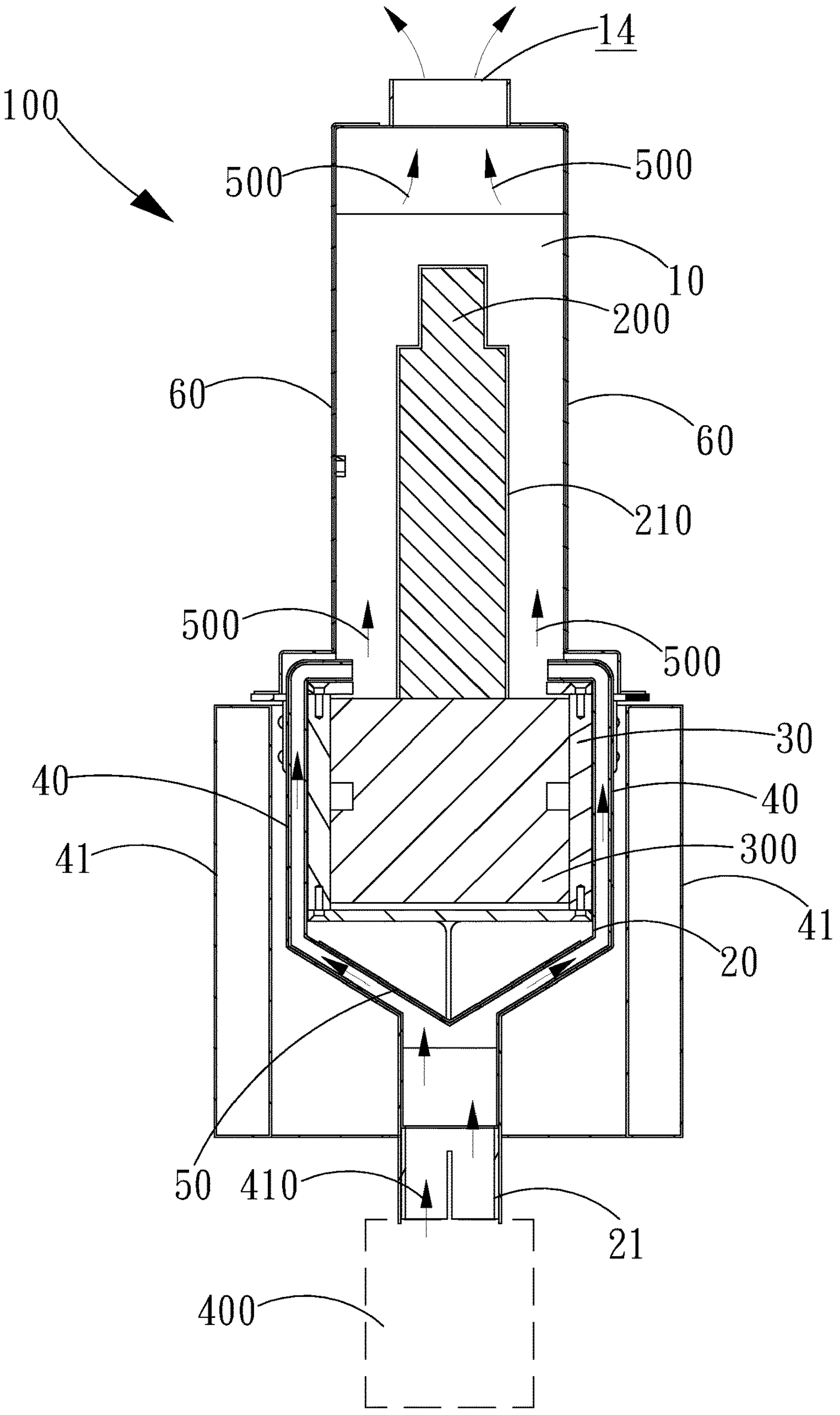
FIG. 6 is a side elevational view, in which a state of dry hot air is applied in a thermal-shrinking oven body to carry out a heat-shrinking packaging operation on an object-to-be-packaged.

Referring firstly to FIGS. 1, 2, 3, and 4, the present invention provides a dehumidification device 100 of a package thermal-shrinking oven, which comprises at least one thermal-shrinking oven body 10, which is combined with a packaging and conveying strip 300 for conveying an object-to-be-packaged 200 (as shown in FIG. 5), wherein two sides of a lower portion of the thermal-shrinking oven body 10 are each provided with at least one connecting portion 11; the two sides of the lower portion of the thermal-shrinking oven body 10 are each provided with at least one pair of connecting lugs 12, the connecting lugs 12 being each formed with at least one elongated hole 121, and at least one pair of mounting frames 13, the mounting frames 13 each having a top surface that is formed with at least one pair of fastening apertures 131 to respectively correspond to the elongated holes 121 of the connecting lugs 12 of the thermal-shrinking oven body 10 to be fastened thereto and combined therewith by means of at least one pair of bolts 131A, the mounting frames 13 each having a lower end that is formed with a plurality of elongated connecting holes 132 for each being fastened by at least one bolt 132A to two sides of the packaging and conveying strip 300, the mounting frames 13 each having a lower-portion middle section that is provided with at least one pair of joining portions 133, the joining portions 133 being each formed with at least one threaded hole 134, wherein the connection arrangement between the thermal-shrinking oven body 10 and the packaging and conveying strip 300 is not limited to connection by means of the mounting frames 13, and other equivalent connection structures are within the scope of the present invention, the thermal-shrinking oven body 10 having a top that is formed with at least one ventilation orifice 14;

at least one steam conduit 20, which is provided, on a lower end thereof, with an ingress opening 21, the ingress opening 21 being connected to at least one steam device 400, so that hot steam 400A generated in the steam device 400 is conducted into the steam conduit 20 (as shown in FIG. 3), two sides of an upper portion of the steam conduit 20 being respectively connected to the connecting portions 11 on the two sides of the lower portion of the thermal-shrinking oven body 10, an external part of the upper portion of the steam conduit 20 being provided with at least one pair of lugs 22, the lugs 22 being each formed with at least one threaded fastening hole 221, the steam conduit 20 being not constrained to any shape, and a shape having a Y-shaped cross section being taken as an example for illustration in the present invention;

at least one thermal isolation board 30, two sides of an upper portion of which are each formed with at least one pair of fastening apertures 31 to respectively fasten by means of at least one fastening bolt 311 to the two side of the packaging and conveying strip 300 to which the thermal-shrinking oven body 10 is mounted, the two sides of the upper portion of the thermal isolation board 30 being each formed with at least one pair of through holes 32, the through holes 32 corresponding to the threaded fastening holes 221 of the lugs 22 of the steam conduit 20 to each receive at least one bolt 321 to penetrate therethrough for fastening and connecting;

at least one pair of first heaters 40, which are respectively mounted to exterior of two sides of the steam conduit 20 to provide a first heating operation to the hot steam 400A at the two sides of the steam conduit 20 to form moisture-removed dry hot gas 500 for being subsequently guided along the two sides of the upper portion of the steam conduit 20 through the connecting portions 11 of the thermal-shrinking oven body 10 into an interior of the thermal-shrinking oven body 10 to implement a heat-shrinking packaging operation on the object-to-be-packaged 200 located on the packaging and conveying strip by means of the dry hot gas 500 (as shown in FIG. 6), wherein the first heaters 40 are not limited to any specific type, and one that is formed of a silicone rubber electrical heating plate is taken as an example for illustration in the present invention, and at least one pair of protective covers 41, which are respectively arranged to enclose the two sides of the steam conduit 20 and outsides of the first heaters 40, two sides of an upper portion of the protective covers 41 being each formed with at least one elongated hole 411, the elongated holes 411 respectively corresponding to the threaded holes 134 of the joining portions 133 of the mounting frames 13 to each receive at least one bolt 412 penetrating through and fastened to the corresponding threaded hole 134 for fixing and combining so as to have the protective covers 41 respectively fixed to and enclosing the two sides of the steam conduit 20 and the outsides of the first heaters 40;

at least one second heater 50, which is mounted on a bottom of interior of the steam conduit 20 to carry out the first heating operation, in synchronization with the first heaters 40, on the hot steam 400A at the bottom of the inside of the steam conduit 20, wherein the second heater 50 is not limited to any specific type, and one that is formed of a silicone rubber electrical heating plate is taken as an example for illustration in the present invention; and the second heater 50 is not limited to any specific shape, and in the present invention, one that has a V-shaped cross section is taken as an example for illustration; and at least one pair of third heaters 60, which are respectively mounted to two sides of exterior of thermal-shrinking oven body 10 to carry out an enhanced moisture-removing effect in synchronization with the heat-shrinking packaging operation of the dry hot gas 500 in the interior of the thermal-shrinking oven body 10, wherein the third heaters 60 are not limited to any specific type, and one that is formed of a silicone rubber electrical heating plate is taken as an example for illustration in the present invention.

Further referring to FIGS. 5 and 6, a preferred example of application of the dehumidification device 100 of the package thermal-shrinking oven according to the present invention is provided, wherein the object-to-be-packaged 200, which is made in the form of a bottle, is sleeved with a heat-shrinkable package film 210 at a location on the packaging and conveying strip 300 that corresponds to a front end of the thermal-shrinking oven body 10, and is conveyed by the packaging and conveying strip 300 into the interior of the thermal-shrinking oven body 10, wherein the first heaters 40, the second heater 50, and the third heaters 60 are respectively mounted to the steam conduit 20 and the exterior of the thermal-shrinking oven body 10 to correspond to a path of conveyance of hot steam 400A and heat-shrinking packaging operation performed by the dry hot gas 500, in order to implement removal of moisture from the hot steam 400A generated by the steam device 400 to which the steam conduit 20 is connected to form dry hot gas 500 to implement a homogeneous and dry-hot-gas-based heat-shrinking packaging operation on the object-to-be-packaged 200 located on the packaging and conveying strip 300 and inside the thermal-shrinking oven body 10 to have the heat-shrinkable film 210 that is sleeved on the object-to-be-packaged 200 thermally shrunk, for one time operation, on and package an outside surface of the object-to-be-packaged 200, and no liquid water and water droplets are accumulated on the outside surfaces of the object-to-be-packaged 200 and the heat-shrinkable film 210 to thereby ensure clean and hygiene of the outside surfaces of the object-to-be-packaged 200 and the heat-shrinkable film 210 and food safety. Further, a remaining portion of the dry hot gas 500 that is applied to carry out the heat-shrinking packaging operation on the heat-shrinkable film 210 of the object-to-be-packaged 200 is discharged out through the ventilation orifice 14 formed in the top of the thermal-shrinking oven body 10 (as shown in FIG. 5).

The dehumidification device 100 of the package thermal-shrinking oven according to the present invention is shown in FIGS. 1-6, wherein the description and drawings are provided for easy explanation of the technical contents and technical measures of the present invention, and the preferred embodiments so described provide only a fraction of the present invention and are not intended for constraining the scope thereof, and further any equivalent substitute and modification of structure and component of the details of the present invention are considered failing within the scope of the present invention as defined solely by the appended claims.

What is claimed is:

1. A dehumidification device of a package thermal-shrinking oven, comprising:

at least one thermal-shrinking oven body, which is combined with a packaging and conveying strip for conveying an object-to-be-packaged, two sides of a lower portion of the thermal-shrinking oven body being each provided with at least one connecting portion;

at least one steam conduit, which is connected, at a lower end thereof, with at least one steam device, so that hot steam generated by the steam device is conducted into the steam conduit, two sides of an upper portion of the steam conduit being respectively connected to the connecting portions on the two sides of the lower portion of the thermal-shrinking oven body;

at least one thermal isolation board, which is mounted to an upper portion of interior of the steam conduit and enclosing two sides of the packaging and conveying strip;

at least one pair of first heaters, which are respectively mounted to exterior of two sides of the steam conduit to provide a first heating operation on the hot steam at two sides of the steam conduit to form moisture-removing dry hot gas for being subsequently guided along the two sides of the upper portion of the steam conduit through the connecting portions of the thermal-shrinking oven body into an interior of the thermal-shrinking oven body to implement a heat-shrinking packaging operation on the object-to-be-packaged located on the packaging and conveying strip;

at least one second heater, which is mounted on a bottom of interior of the steam conduit to carry out the first heating operation, in synchronization with the first heaters on the hot steam at the bottom of interior of the steam conduit; and at least one pair of third heaters, which are respectively mounted to two sides of exterior of the thermal-shrinking oven body to carry out an enhanced moisture-removing effect in synchronization with the heat-shrinking packaging operation of the dry hot air in the interior of the thermal-shrinking oven body.

2. The dehumidification device of the package thermal-shrinking oven according to claim 1, wherein the thermal-shrinking oven body has a top that is formed with at least one ventilation orifice.

3. The dehumidification device of the package thermal-shrinking oven according to claim 1, wherein the two sides of the lower portion of the thermal-shrinking oven body are each combined with at least one mounting frame for being combined with two sides of the packaging and conveying strip by means of the mounting frames.

4. The dehumidification device of the package thermal-shrinking oven according to claim 3, wherein the two sides of the lower portion of the thermal-shrinking oven body are each provided with at least one pair of connecting lugs, the connecting lugs being each formed with at least one elongated hole; and the mounting frames each have a top surface that is formed with at least one pair of fastening apertures to respectively correspond to the elongated holes of the connecting lugs of the thermal-shrinking oven body to be fastened thereto and combined therewith by means of at least one pair of bolts.

5. The dehumidification device of the package thermal-shrinking oven according to claim 3, wherein the mounting frames that are mounted to the lower portion of the thermal-shrinking oven body each have a lower end that is formed with a plurality of elongated connecting holes for each being fastened by at least one bolt to two sides of the packaging and conveying strip.

6. The dehumidification device of the package thermal-shrinking oven according to claim 1, wherein the two sides of the lower portion of the thermal-shrinking oven body are each combined with at least one mounting frame, the mounting frames each having a lower-portion middle section that is provided with at least one pair of joining portions, the joining portions being each formed with at least one threaded hole; and at least one pair of protective covers are respectively arranged to enclose two sides of the steam conduit and outsides of the first heaters, and two sides of an upper portion of each of the protective covers are each provided with at least one elongated hole, the elongated holes respectively corresponding to the threaded holes of the joining portions of the mounting frames to each receive at least one bolt penetrating through and fastened to the corresponding threaded hole for fixing and combining.

7. The dehumidification device of the package thermal-shrinking oven according to claim 1, wherein the steam conduit is provided, on a lower end thereof, with an ingress opening so as to connect by means of the ingress opening to the steam device to introduce the hot steam into the steam conduit.

8. The dehumidification device of the package thermal-shrinking oven according to claim 1, wherein the steam conduit is provided, on an external part of an upper portion thereof, with at least one pair of lugs, the lugs being each formed with at least one threaded fastening hole, and the two sides of the upper portion of the thermal isolation board are each formed with at least one pair of through holes, the through holes corresponding to the threaded fastening holes of the lugs of the steam conduit to each receive at least one bolt to penetrate therethrough for fastening and connecting.

9. The dehumidification device of the package thermal-shrinking oven according to claim 1, wherein the steam conduit has a cross-section having a Y-shape.

10. The dehumidification device of the package thermal-shrinking oven according to claim 1, wherein the two sides of the upper portion of the thermal isolation board are each formed with at least one pair of fastening apertures to respectively fasten by means of at least one fastening bolt to two sides of the packaging and conveying strip with which the thermal-shrinking oven body is combined.

11. The dehumidification device of the package thermal-shrinking oven according to claim 1, wherein the second heater has a cross-section having a V-shape.

* * * * *